June 19, 1934.  C. M. SEMLER  1,963,871
TIRE CURING BAG
Filed March 18, 1932    2 Sheets-Sheet 1
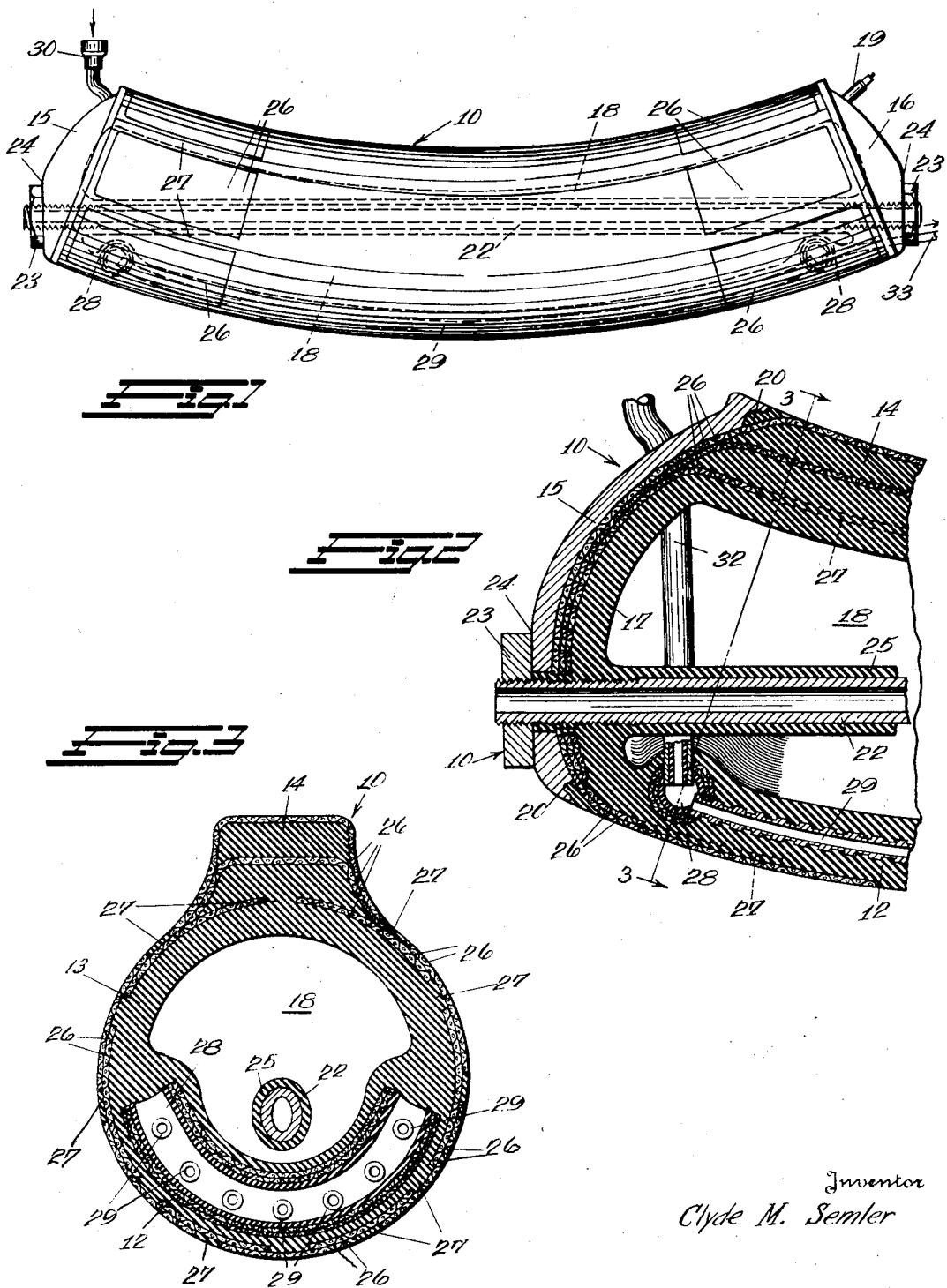
Inventor
Clyde M. Semler

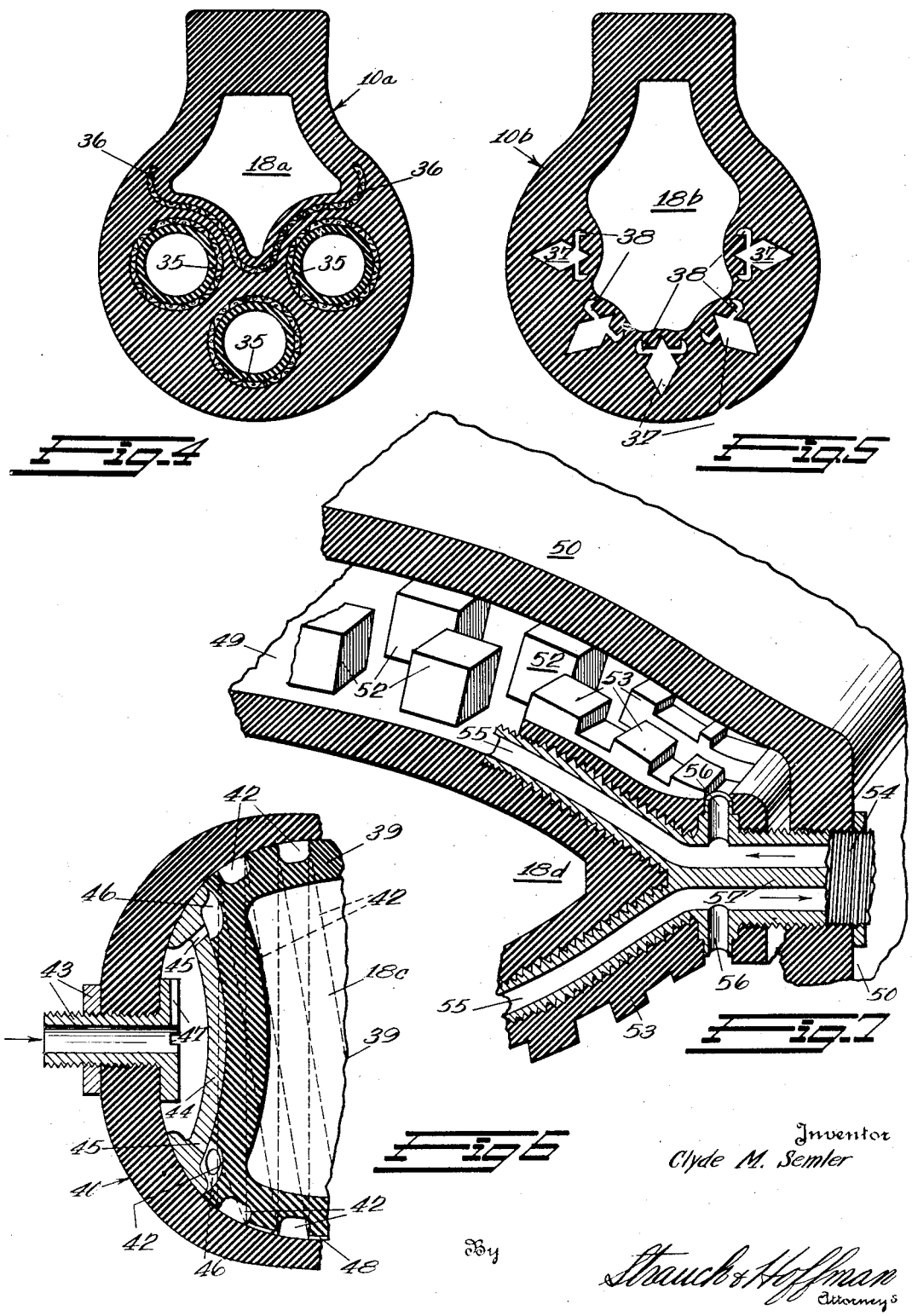

Patented June 19, 1934

1,963,871

UNITED STATES PATENT OFFICE 1,963,871

TIRE CURING BAG

Clyde M. Semler, Cuyahoga Falls, Ohio

Application March 18, 1932, Serial No. 599,776

12 Claims. (Cl. 18—45)

The present invention relates to improved methods and devices for curing and repairing tires, i. e., for operating upon rubber tire casings which are designed to receive inflated inner tubes.

In my prior patent application Serial No. 511,370, filed January 26th, 1931, there is disclosed a method for curing and repairing tires by indirect heat transfer. In that application the heat was first applied to a gaseous medium such as air under pressure, and the air then utilized to transfer the heat to the walls of an air bag. This was done so that a heating medium, such as steam, could be passed into or through the curing bag at pressures sufficiently low to prevent overheating of the tire rubber. The temperature of steam ordinarily would be too high if it were injected into the bag under a pressure as high as that of the air used in the latter.

It is the primary object of the present invention to obtain substantially the same results as in said earlier application but by direct application of heat to the walls of the curing bag. This object preferably is accomplished by forming or inserting substantially incompressible heating chambers within the bag walls. The chambers being sufficiently incompressible to resist the high air pressure of the inflated bag, it follows that low pressure, non-burning steam or the like may be utilized in the chambers. This method and the bag for performing it may be adopted both in the treatment of new tires and in repairing old tires.

The principle of application of heat between the inner and outer walls of a curing bag may be advantageously adopted in many old types of bags in order to obtain higher speed and efficiency of heat transfer and to obtain better and cheaper bag structure. The relative pressures and particular substances mentioned above need not be utilized in all instances. For example water or electricity may be the heating medium, and sometimes it may be found desirable to use one or more channels in the bag wall for cooling a portion of the tire. Accordingly, it may be broadly stated that a major object of this invention resides in the provision of a chambered wall as a part of a curing bag.

As previously indicated it is an important object of the present invention to provide a curing bag having a central chamber for receiving high pressure fluid, and one or more chambers incorporated in the walls to receive either low pressure fluid or a non-expanding heating element, and yet be non-collapsible under the higher central pressure. In this connection it is also an object to so design the heating fluid inlet that the latter can not be closed by expansion of the rubber bag. The central chamber may be used, if desired, for the application of heat as well as pressure. Also, in some instances on certain types of repair jobs, it may be desirable to use one or more of the chambers for the purpose of cooling a part of the tire while curing another portion of the latter.

Another major object of my invention resides in the provision of an improved repair bag. Some additional objects, subordinate to this major object, are as follows:

It is an object of this invention to devise a repair bag having removable end fittings, whereby the entire bag need not be discarded when a part has been worn out. For example, if the rubber walls become burnt or otherwise deteriorated, the end caps may be detached and then secured to a new rubber tube, thus materially reducing the overhead expenses of a tire repair shop.

A further object consists in providing means, in a repair bag having end caps, which will prevent the ends of the rubber tube from blowing out and yet which will not restrict the expansion of the tube.

Another object of the present invention is to so design the member connecting the end caps of a repair bag that the said member may serve as a fluid conduit during use of the bag.

Still another object is to construct a repair bag with headers at its ends and a plurality of conduits connected between the headers for the purpose of obtaining uniform fluid distribution and high efficiency of heat transfer.

Other general and more specific objects of the present invention will appear upon a study of the following detailed description and claims when taken in conjunction with the accompanying drawings, wherein:

Figure 1 is a side elevational view of one form of my invention, embodied in a repair bag but having principles readily adaptable for utilization in any type of curing unit.

Figure 2 represents an enlarged partial section taken vertically and longitudinally of the left end of the bag of Figure 1.

Figure 3 is a view taken in cross-section on the plane of the line 3—3 in Figure 2.

Figure 4 is a similar sectional view taken through a modified form of curing bag.

Figure 5 represents a like cross-section of a further modification. The bags of Figures 4 and 5 may be either sectional repair units or circular tubes for curing new tires.

Figure 6 is a view similar to Figure 2, disclosing the end structure of still another modification, comprising a capless repair bag having fluid passages formed by the union of two concentric rubber sleeves.

Figure 7, in enlarged partial cross-section, shows the united sleeve feature of Figure 6 adopted, with slight modification in an endless bag for curing new tires.

With continued reference to the drawings, wherein like numerals are employed to designate like parts, and with particular reference for the moment to that form illustrated in Figures 1 to 3 inclusive:

The complete repair unit, designated generally by the numeral 10, consists of a rubber bag or sleeve section comprising tread, side wall and bead engaging portions 12, 13 and 14 respectively; and a pair of fittings 15 and 16 for receiving the ends of the sleeve section. The sleeve may be open-ended if desired but preferably is provided with integral end portions 17 which serve to strengthen the unit. The sleeve section forms a central chamber 18 into which air may be admitted under pressure by way of a conventional valve 19 carried by the fitting 16, so that when the bag is in use its tread and side wall portions may be expanded into firm surface contact with the corresponding portions of a tire to be repaired. The vulcanizing or curing heat may be supplied in any desired manner, but preferably is applied in a manner later to be set forth.

The end fittings 15 and 16 have concavities for snugly receiving the ends of the sleeve section, and their edges are peripherally undercut, as at 20, to lockingly receive some of the sleeve material and thus assist in preventing radial blowouts. The end fittings are firmly spaced, to prevent longitudinal expansion of the bag, by an inextensible tie member which preferably takes the form of a conduit or pipe 22. The ends of the pipe pass through the fittings and receive large nuts 23 which engage expansive flat surfaces 24 on the fittings. Since the bag is curved in shape and the pipe is straight, these nuts and surfaces are offset from the longitudinal axis of the bag in order that the pipe shall not intersect the wall of the central chamber 18. Of course, the pipe may be curved and have its ends secured against rotation in the fittings at points located in the bag axis, if desired. The pipe preferably is surrounded with a rubber sheath 25 which merges with the end walls to seal the latter perfectly relative to the pipe ends and thus to prevent escape of the air under pressure from chamber 18.

As a further means for preventing the ends of the sleeve proper from blowing out radially relative to the fittings 15 and 16, the ends of the sleeve are built up of combined rubber and fabric. The fabric is incorporated in the form of cord sheets 26 of various sizes which are laid over an end of the sleeve and then folded toward the other sleeve end. Each strip of fabric thus caps the sleeve end and has its own two ends diametrically opposed on the sides of the sleeve. These opposed ends do not extend far beyond the fittings and hence do not limit the expansibility of the bag. The opposed strip ends are slitted longitudinally to form gaps 27. The several sheets are applied in superposed layers, with the slitted end strips of the layers staggered circumferentially relative to the others, as shown, so as not to restrict the radial expansion of the walls in which the slotted strips are embedded or laid.

If desired, steam may be passed through the conduit 22 to heat the air in the chamber 18 and thus indirectly heat the air bag walls, as in my aforementioned copending application, Serial No. 511,370. However, the heating preferably is accomplished in a direct manner by building into the tread and side walls a pair of end headers 28 interconnected by flexible conduits 29. A steam connection 30 is mounted in the fitting 15 and connected with a strong flexible feed line 32 that has its lowered end vulcanized into communication with one of the headers 28. In like manner a drain line 33 is connected into the other header for the purpose of removing condensate.

The headers 28 and conduits 29 may be formed of any one of a number of materials, so long as they are flexible and of sufficient strength to resist collapse under the internal pressure of the air in chamber 18,—the chief requisite being that their volumetric capacities remain unchanged so that steam may be utilized under relatively low pressures which correspond to temperatures that will not cause "burning" of the bag rubber and the tire rubber. In the illustration each header consists of a piece of ordinary fabric-covered pump hose extending across the tread and side wall portions, wherein it is snugly vulcanized; and each conduit 29 comprises a section of conventional flexible metal tubing having its ends set and vulcanized into the respective headers. The headers and conduits may extend up through the side walls a greater or lesser distance than illustrated in Figure 3, if desired, depending upon the area of the bag surface to which direct heat should be applied.

It sometimes is desirable to mount the header and conduit assembly (or equivalent heating unit) loosely in the tread portion, instead of snugly as illustrated, for the purpose of ensuring that the assembly does not interfere with free universal expansion of the bag,—e. g., the conduits 29 may be so disposed as to have no vulcanized or other binding engagement with the rubber of the tread portion.

On certain types of repair jobs, it may be expedient to heat only the tread portion, in which event a cooling medium such as cold water may be passed through the pipe 22 while steam is injected into the tread wall. Sometimes it may be advantageous to supply heat to all the conduits. Again, it may be desirable in some instances to heat the tire beads and side walls while holding the tire tread at low temperature to prevent accelerated deterioration thereof, and to that end the heat may be supplied to the pipe 22 while either running cold water into the line 32 or merely leaving the lines 32 and 33 open to permit the natural escape of any heat contained in the header assembly. When desired, an electrical or other type of heating unit may be substituted, either loosely or snugly, for the header and conduit assembly.

It will thus be seen that with the improved air bag of Figures 1 to 3, new tires may be cured (by elongating the structure) and old tires may be repaired by selective concentration of heat at any desired spot. This selectivity of heat application may be increased by eliminating the headers and providing separate steam inlets for the conduits 29. Since the end fittings 15 and 16 are readily detachable, the bag can be cheaply serviced, whenever it is worn out, merely by substituting a new sleeve for the old. Heretofore it has been necessary to purchase a complete replacement bag.

In Figures 4 and 5, there are shown modifications of the curing bag wall structure of Figures 1 to 3. The bag 10a of Figure 4 has a comparatively smaller air chamber, 18a, due to thickening of the tread and side wall portions to receive several longitudinal heating conduits in the form of fabric-reenforced hose 35. A longitudinal strip of cord fabric 36 is built into the rubber between the air chamber and conduits to strengthen the bag without preventing normal expansion thereof. The conduits may be separately supplied with a heating medium or heating unit, or may be connected to a common source of heat as in Figures 1 to 3. They will not collapse when the bag is inflated and hence can take steam under low, non-burning temperature for direct application of heat to the tread and sidewall. This is also true of the conduits in Figure 5, now to be described.

The bag 10b of Figure 5 differs from that of Figure 4 only in that the former has a larger central chamber 18b, surrounded by conduits 37 that are formed, by a tubing or similar process, directly in the tread and sidewall material. In this manner, the expense of strengthened hose or pipe conduits is eliminated, and the conduits 37 are of a design inherently permitting free universal expansion of the bag. The directly formed conduits 37 are given a special irregular shape and disposition to prevent them from collapsing under pressure, and are provided with small extension crevices 38 which close and permit the rubber to flow and jam while expanding. It should be understood that in this, and also in the other illustrated forms of the invention, there may be some reduction in the sizes of the flexible conduits when the bag is inflated; but that it is only essential that the cross-sectional areas of the conduits remain sufficiently large to permit the heating medium to flow through them without raising said medium to a pressure which is impracticable or which corresponds to a temperature that is too high.

The modified bag of Figure 6 is formed without end caps but obviously may be provided with them if desired. This bag is constructed of two complemental sections 39 and 40 in order that its heating chamber may be conveniently formed by molding or similar process. The inner section 39 is a small tube complete in itself and designed to fit snugly within the outer section 40. The surface of the inner section has a helical groove 42 formed thereon, one end of which terminates on the end wall of the section. Steam is supplied to the outer section by way of a fitting 43 secured thereto, and immediately enters the groove 42 through which it passes spirally along the double-sleeve wall of the unit to heat the latter. Air under pressure is supplied to the central chamber 18c and hence kept separated from the steam.

In order that expansion of the inner section shall not shut off the steam inlet, a curved metal plate 44 may be provided to hold the rubber away from the fitting 43. This plate has a series of apertures 45 behind which a circular recess 46 is formed in the surface of the inner bag. Radial slots 47 may be cut on the inner end of the steam fitting to accomplish the same purpose as the plate.

For the purpose of preventing condensate from impeding the flow of steam through the helical groove, the loops of the latter may be interconnected by a series of small channels 48 running longitudinally of the surface of the inner bag. The condensate may be removed from the other end of the groove in any suitable manner. The channels 48 may be employed at spaced intervals circumferentially of the inner bag in order to obtain more thorough and uniform application of heat to the walls; and to ensure drainage of condensate regardless of any position that the unit may be given while its disclosed end is disposed higher than the other when the unit is in use.

The double-wall feature of Figure 6 is carried forward into Figure 7, wherein there is shown part of a cross-section taken normal to the circular center line of an endless bag for curing new tires. Only the bead and one side wall portion of the unit are seen in Figure 7; and the inner and outer bags 49 and 50 respectively are cut by two separate parallel planes so as to reveal a substantial surface portion of the inner bag.

The inner bag 49 has a central chamber 18d which may be inflated in any conventional or suitable manner, and has on its outer surface a plurality of integral lugs 52, and stepped lugs 53, cured or molded in place. The lugs 52 are of substantial uniform size and spotted in haphazard fashion about the entire tread and side wall portions of the bag, while the stepped lugs 53 are located adjacent the bead portion of the bag and are gradually reduced in height toward the inner full-circle diameter thereof. As a result, when the inner bag is fitted within or covered over with the outer bag, the groups of lugs provide an intricate maze of passageways between the two bags and also prevent the pressure of chamber 18d from closing said passageways.

The outer bag 50 preferably is curved upon the inner bag 49. First, however, one or more special metal fittings 54 are set and vulcanized into the bead portion of the inner bag, the fitting being of sufficient length to project outwardly through the corresponding portion of the outer bag for connection with a source of heated fluid. The fitting is equipped with two sets of extensions forming conduits 55 and 56 through which the fluid may be fed into the labyrinth formed by the lugs 52 and 53, but if desired a partition 57 may be provided for separating the two sets of conduits so that one of them may serve as an outlet for wet steam and condensate.

It should be understood that the lugs of Figure 7 may be formed on the inner surface of the outer bag 50 instead of as shown; and in like manner that the spiral groove 42 of Figure 6 may be placed on the outer bag 40.

Each of the bags of Figures 5 to 7 may be slightly redesigned to receive compressed air in its chambered walls and a heating medium or element in its central chambers merely by adding any suitable device,—e. g., an internal metallic sleeve, for preventing the walls from expanding inwardly when inflated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a tire curing bag of either sectional or full circle design, an expansible sleeve-like wall shaped externally to conform substantially with the interior surface of a tire to be treated and to form a central fluid chamber, and at least one chamber provided between the surfaces of said wall for supplying a second fluid directly to the latter.

2. In a tire curing bag of either sectional or full circle design, a sleeve-like wall shaped externally to conform substantially with the interior surface of a tire to be treated, and at least one chamber provided between the surfaces of said wall for applying heat directly to the latter, said wall structure being closed to provide a central pressure chamber in the bag, and said first mentioned chamber being so formed as to successfully resist complete constriction thereof by the pressure of said central chamber.

3. In a tire curing bag of either sectional or full circle design, a sleeve-like wall shaped externally to conform substantially with the interior surface of a tire to be treated, and at least one chamber provided between the surfaces of said wall for applying heat directly to the latter, said wall being compositely formed from several layers of material, one of which layers contains said heat applying chamber.

4. A closed flexible curing bag having relatively thin side wall portions interconnected by a tread portion, and means provided within the material of at least one of said portions to form a heat-transferring conduit or chamber.

5. A curing bag having side wall portions interconnected by a tread portion, and means provided in the material of at least one of said portions to form a heat-transferring conduit or chamber, said portions being joined to provide a central pressure chamber within the bag, one of said chambers being adapted to receive pressure fluid and the other to receive a heating medium or element, and there being means provided to prevent the collapse of the heating chamber when the pressure chamber is inflated.

6. An expansible curing bag having side wall portions interconnected by a tread portion to form a pressure chamber, and means provided in the material of at least one of said portions to form a heat-transferring conduit or chamber, there being additional heat-transferring means disposed within said pressure chamber.

7. A tire repair bag comprising an expansible sleeve, a substantially inextensible member mounted internally of said sleeve and arranged longitudinally of the latter, a pair of fittings spaced by said member said fittings being designed to receive the ends of said sleeve, at least one of the fittings having an elongated peripheral formation interlocked with the material of one of said ends, and means for detachably connecting at least one of said fittings to said member.

8. A tire repair bag comprising an expansible rubber sleeve, and a cap mounted on at least one end of said sleeve, said cap being recessed to receive and overlap the said end of the sleeve and having a peripheral groove receiving part of the rubber of the bag, thus to prevent the latter from blowing out radially adjacent the cap.

9. A tire repair bag comprising an expansible sleeve, a pair of rigid caps fitted upon and receiving the ends of said sleeve, and substantially inextensible means disposed within said sleeve and eccentrically connected to said caps, said means forming a straight and relatively light heat-exchanging conduit through which fluid may be fed the bag.

10. A tire repair bag comprising an expansible sleeve, fittings in the form of caps secured to and receiving the ends of said sleeve, and means built into the sleeve adjacent said ends to strengthen the latter against rupture adjacent the caps, said means being designed to permit natural radial expansion of the sleeve and comprising layers of cord fabric material running longitudinally of the sleeve ends and passing under the edges of said caps, said layers being overlapped upon each other so that a crack at one surface of the sleeve cannot work its way radially through the fabric layers.

11. A tire curing bag comprising an expansible tube having walls surrounding an axial internal chamber, heat-transfer means disposed in said internal chamber, and further heat-transfer means formed between the inner and outer surfaces of the walls of the tube.

12. A tire curing bag comprising a deformable sleeve like member, a main conduit embodied in the member in the form of a header mounted substantially transversely of said member, a plurality of additional conduits connected into communication with said header and extending in the direction of the longitudinal axis of said member, means for establishing communication between said header and the outside of the member, and means for establishing communication between said additional conduits and the outside of the member.

CLYDE M. SEMLER.